(12) United States Patent
Otaki et al.

(10) Patent No.: US 12,522,103 B2
(45) Date of Patent: Jan. 13, 2026

(54) VEHICLE AND METHOD OF CONTROLLING VEHICLE

(71) Applicant: TOYOTA JIDOSHA KABUSHIKI KAISHA, Toyota (JP)

(72) Inventors: Mitsutoshi Otaki, Susono (JP); Shinji Nakanishi, Mishima (JP); Tetsuya Waseda, Susono (JP); Jun Yoshida, Mishima (JP); Tsubasa Migita, Sakai (JP); Yoshihiro Uchida, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 18/425,230

(22) Filed: Jan. 29, 2024

(65) Prior Publication Data
US 2024/0326647 A1    Oct. 3, 2024

(30) Foreign Application Priority Data

Mar. 27, 2023 (JP) ................ 2023-049723

(51) Int. Cl.
| | |
|---|---|
| *H01M 10/44* | (2006.01) |
| *B60L 50/60* | (2019.01) |
| *B60L 58/12* | (2019.01) |
| *H01M 10/46* | (2006.01) |

(52) U.S. Cl.
CPC ............ *B60L 58/12* (2019.02); *B60L 50/60* (2019.02); *H01M 10/44* (2013.01); *H01M 10/46* (2013.01); *B60L 2240/16* (2013.01); *B60L 2240/18* (2013.01); *H01M 2220/20* (2013.01)

(58) Field of Classification Search
CPC ...... B60L 58/12; B60L 50/60; B60L 2240/16; B60L 2240/18; B60L 58/10; B60L 2240/54; H01M 10/44; H01M 10/46; H01M 2220/20; H01M 10/0562; Y02E 60/10

See application file for complete search history.

(56) References Cited

U.S. PATENT DOCUMENTS

| | | | |
|---|---|---|---|
| 9,673,642 B2 * | 6/2017 | Katsumata | ................ B60L 3/04 |
| 2008/0154463 A1 * | 6/2008 | Kuo | .................... B60L 15/2009 701/41 |
| 2013/0162026 A1 * | 6/2013 | Kinoshita | ............... B60L 50/64 307/9.1 |

FOREIGN PATENT DOCUMENTS

JP    2009-259563 A    11/2009

* cited by examiner

*Primary Examiner* — Michael C Zarroli
(74) *Attorney, Agent, or Firm* — SoraIP, Inc.

(57) ABSTRACT

The electrified vehicle includes an all-solid-state battery in which a positive electrode layer, a solid electrolyte layer, and a negative electrode layer are stacked in the front-rear direction (predetermined direction) of the electrified vehicle. The electrified vehicle also includes an acceleration sensor that detects a first acceleration in a direction perpendicular to the longitudinal direction and a second acceleration in the longitudinal direction. In an electrified vehicle, charging and discharging of the all-solid-state battery is prohibited when the first acceleration exceeds the first reference value, and the all-solid-state battery is prohibited until the second acceleration exceeds a second reference value that is larger than the first reference value, charging/discharging is allowed.

11 Claims, 6 Drawing Sheets

VEHICLE AND METHOD OF CONTROLLING VEHICLE

CROSS-REFERENCE TO RELATED APPLICATION

This application claims priority to Japanese Patent Application No. 2023-049723 filed on Mar. 27, 2023, incorporated herein by reference in its entirety.

BACKGROUND

1. Technical Field

The present disclosure relates to a vehicle and a method of controlling a vehicle.

2. Description of Related Art

Japanese Unexamined Patent Application Publication No. 2009-259563 (JP 2009-259563 A) discloses an all-solid-state lithium secondary battery element including an upper current collector fixed to a lower part of a structure, a lower current collector supported by an upward pressing force from a support mechanism, and a power generation element sandwiched between the upper current collector and the lower current collector. The support mechanism cancels the pressing force when receiving an external impact. Consequently, the lower current collector moves downward due to gravity, and separation is caused at any position between the upper current collector and the power generation element, within the power generation element, or between the lower current collector and the power generation element. As a result, charging and discharging of the all-solid-state lithium secondary battery element is stopped.

SUMMARY

In JP 2009-259563 A mentioned above, however, consideration is not given to what kind of impact is applied to the all-solid-state lithium secondary battery element. Therefore, charging and discharging of the all-solid-state lithium secondary battery element may be stopped even if no particular problem is caused, depending on the form of the impact.

The present disclosure has been made to address the above issue, and an object of the present disclosure is to provide a vehicle and a method of controlling a vehicle that can suppress charging and discharging of an all-solid-state battery being stopped when there is no need to stop the charging and discharging of the all-solid-state battery.

A first aspect of the present disclosure provides a vehicle including an all-solid-state battery in which a positive electrode layer, a solid electrolyte layer, and a negative electrode layer are stacked in a predetermined direction. The vehicle also includes an acceleration sensor that detects a first acceleration in a direction intersecting the predetermined direction and a second acceleration in the predetermined direction.

In the vehicle, charging and discharging of the all-solid-state battery is prohibited when the first acceleration exceeds a first reference value. In the vehicle, in addition, the charging and discharging is allowed until the second acceleration exceeds a second reference value that is larger than the first reference value.

Here, the all-solid-state battery has higher mechanical strength in the stacking direction of layers than in a direction intersecting the stacking direction. Thus, as described above, it is possible to suppress charging and discharging of the all-solid-state battery being stopped, even though the mechanical strength of the all-solid-state battery is sufficient, as the charging and discharging is allowed until the second acceleration in the predetermined direction (stacking direction) exceeds the second reference value that is larger than the first reference value, compared to the case where the charging and discharging is prohibited when the second acceleration exceeds the first reference value. Consequently, it is possible to suppress charging and discharging of the all-solid-state battery being stopped when there is no need to stop the charging and discharging of the all-solid-state battery.

In the vehicle according to the first aspect,
the predetermined direction may be a direction along a front-rear direction of the vehicle. With this configuration, the mechanical strength of the all-solid-state battery in the traveling direction of the electrified vehicle can be made higher than the mechanical strength of the all-solid-state battery in a direction intersecting the traveling direction. As a result, it is possible to suppress charging and discharging of the all-solid-state battery being unnecessarily stopped when a relatively large acceleration occurs in the traveling direction due to a collision or the like of the electrified vehicle.

In the vehicle according to the first aspect,
the predetermined direction may be a direction along a direction of gravity.

With this configuration, the mechanical strength of the all-solid-state battery in the direction of gravity can be made higher than the mechanical strength of the all-solid-state battery in a direction intersecting the direction of gravity. As a result, it is possible to suppress charging and discharging of the all-solid-state battery being unnecessarily stopped when a relatively large acceleration occurs in the direction of gravity (for example, when the acceleration is varied due to vertical shaking when driving on an uneven road surface).

In the vehicle according to the first aspect,
the acceleration sensor may be a three-axis acceleration sensor that detects accelerations in three axes that are orthogonal to each other.

With this configuration, the first acceleration in a direction intersecting the predetermined direction and the second acceleration in the predetermined direction can be detected by only the three-axis acceleration sensor. As a result, it is possible to suppress an increase in the number of components of the electrified vehicle.

A second aspect of the present disclosure provides
a method of controlling a vehicle including an all-solid-state battery in which a positive electrode layer, a solid electrolyte layer, and a negative electrode layer are stacked in a predetermined direction, the method including:

prohibiting charging and discharging of the all-solid-state battery when a first acceleration in a direction intersecting the predetermined direction exceeds a first reference value; and allowing the charging and discharging until a second acceleration in the predetermined direction exceeds a second reference value that is larger than the first reference value.

In the method of controlling a vehicle according to the second aspect of the present disclosure, charging and discharging of the all-solid-state battery is allowed until the second acceleration in the predetermined direction exceeds the second reference value that is larger than the first reference value. Consequently, it is possible to provide a method of controlling a vehicle that can suppress charging and discharging of the all-solid-state battery being stopped when there is no need to stop the charging and discharging of the all-solid-state battery.

According to the present disclosure, it is possible to suppress charging and discharging of the all-solid-state battery being stopped when there is no need to stop the charging and discharging of the all-solid-state battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
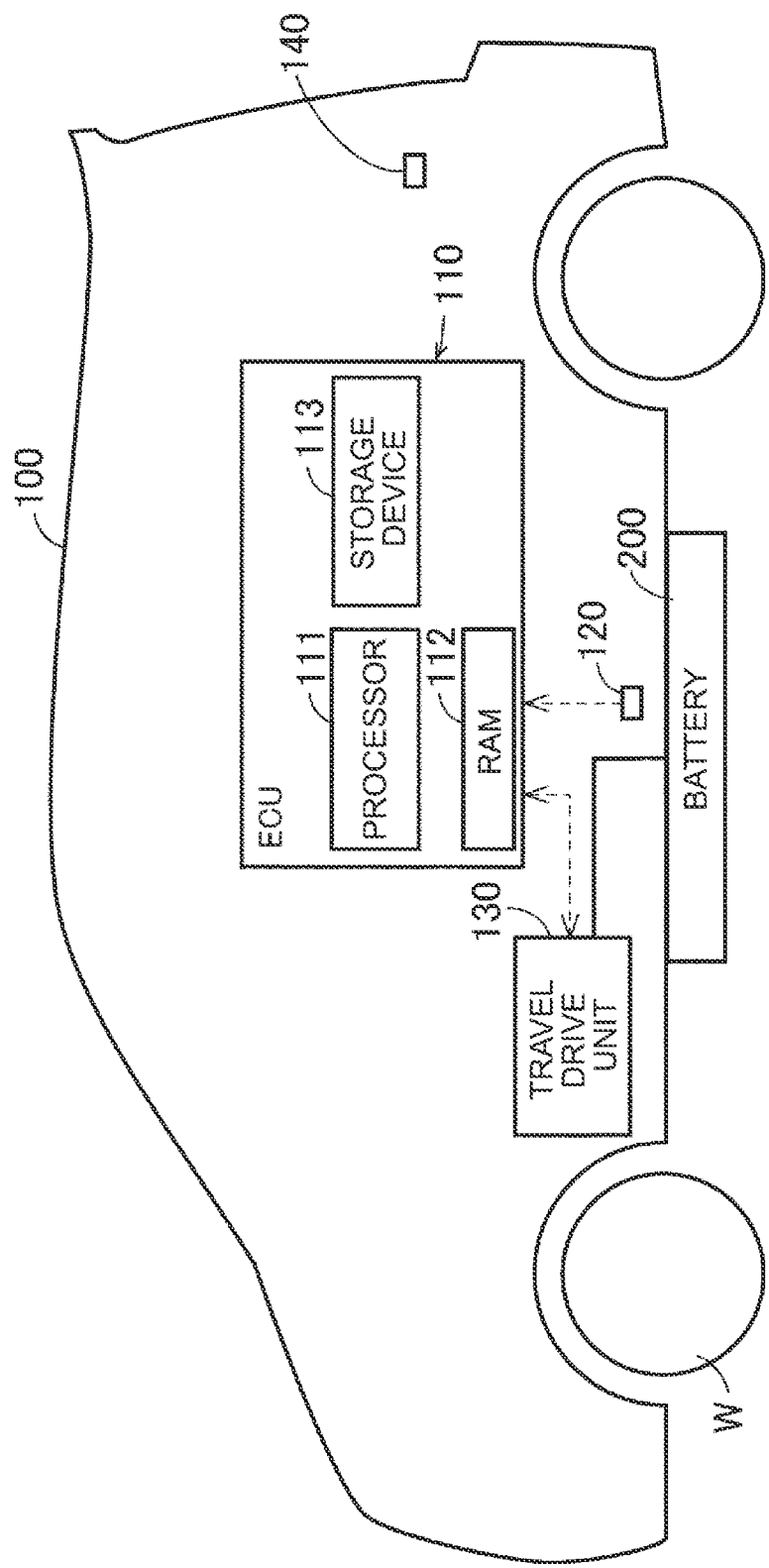
FIG. 1 is a diagram showing the configuration of an electrified vehicle according to the first embodiment.

Hereinafter, embodiments of the present disclosure will be described in detail with reference to the drawings. It should be noted that the same or corresponding portions in the drawings are designated by the same reference signs and repetitive description will be omitted.

First Embodiment

Overall Structure

FIG. 1 is a diagram schematically showing the overall configuration of an electrified vehicle 100 according to the first embodiment. The electrified vehicle 100 includes a battery 200 that stores power for driving. The electrified vehicle 100 is configured to be able to travel using electric power stored in the battery 200. In the first embodiment, the electrified vehicle 100 is a battery electric vehicle (BEV) without an engine (internal combustion engine), but is a hybrid electric vehicle (HEV) with an engine or a plug-in hybrid electric vehicle (PHEV). Note that the electrified vehicle 100 is an example of a "vehicle" in the present disclosure.

The electrified vehicle 100 includes a control device (Electronic Control Unit (ECU)) 110. ECU 110 is configured to perform charge control and discharge control of battery 200. ECU 110 includes a processor 111, a random access memory (RAM) 112, and a storage device 113.

ECU 110 may be a computer. Processor 111 may be a Central Processing Unit (CPU).

RAM 112 functions as a working memory that temporarily stores data processed by processor 111.

The storage device 113 is configured to be able to save stored information. The storage device 113 stores programs as well as information used in the programs (for example, maps, formulas, and various parameters). Various controls in the ECU 110 are executed by the processor 111 executing programs stored in the storage device 113.

Monitoring module 120 includes various sensors that detect the state of battery 200 (e.g., voltage, current, and temperature), and outputs detection results to ECU 110. The monitoring module 120 may be a Battery Management System (BMS) further including a State Of Charge (SOC) estimation function, a State of Health (SOH) estimation function, a function of equalizing cell voltages, a diagnosing function, and a communication function, in addition to the above-mentioned sensor function. ECU 110 can obtain the status of battery 200 (e.g., temperature, current, voltage, SOC, and internal resistance) based on the output of monitoring module 120. Note that the battery 200 is charged (externally charged) with power supplied from a charging facility.

The electrified vehicle 100 further includes a travel drive unit 130, an acceleration sensor 140, and drive wheels W.

Travel drive section 130 includes a Power Control Unit (PCU), a Motor Generator (MG), and a relay (hereinafter referred to as "System Main Relay (SMR)") (none of which are shown), and is connected to battery 200. The electrified vehicle 100 is configured to run using the stored electric power.

The PCU includes, for example, an inverter and a converter. The PCU is controlled by ECU 110.

MG is, for example, a three-phase AC motor generator. The MG is driven by the PCU and is configured to rotate the drive wheels W. The PCU drives the MG using power supplied from the battery 200. Further, the MG is configured to perform regenerative power generation and supply the generated power to the battery 200.

The SMR is configured to switch connection/cutoff of the power path from the battery 200 to the PCU. The SMR is placed in a closed state (connected state) when the electrified vehicle 100 is running.

Figure 2:
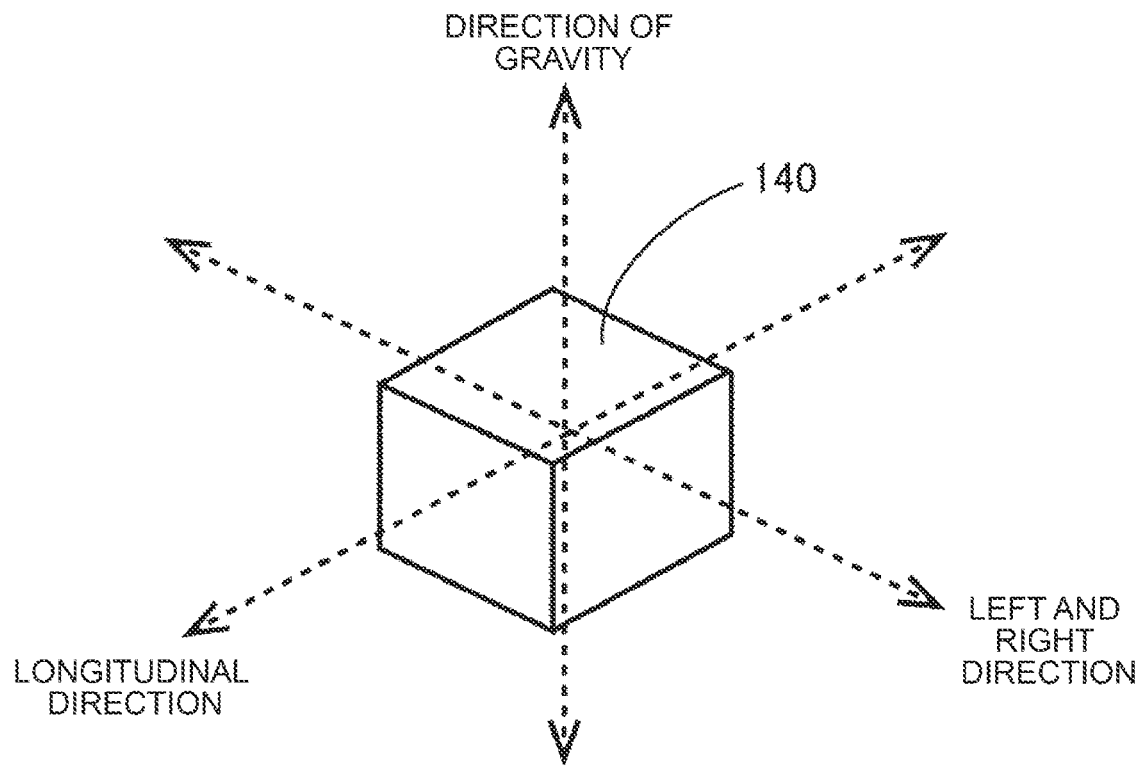
FIG. 2 is a schematic diagram showing the configuration of an acceleration sensor.

FIG. 2 is a diagram showing the direction in which the acceleration sensor 140 detects acceleration. The acceleration sensor 140 is a three-axis acceleration sensor that detects acceleration in three axes that are orthogonal to each other. Specifically, acceleration sensor 140 is mounted on electrified vehicle 100 to detect acceleration in the longitudinal direction of electrified vehicle 100, acceleration in the lateral direction of electrified vehicle 100, and acceleration in the direction of gravity. Note that the acceleration sensor 140 is arranged, for example, at the rear of the electrified vehicle 100 (see FIG. 1). Note that the front-back direction is an example of the "predetermined direction" of the present disclosure. Further, each of the left-right direction and the gravitational direction is an example of a "direction intersecting a predetermined direction" in the present disclosure.

Battery 200 includes an all-solid-state battery 210. Next, the configuration of the all-solid-state battery 210 will be explained.

All-Solid-State Battery

Figure 3:
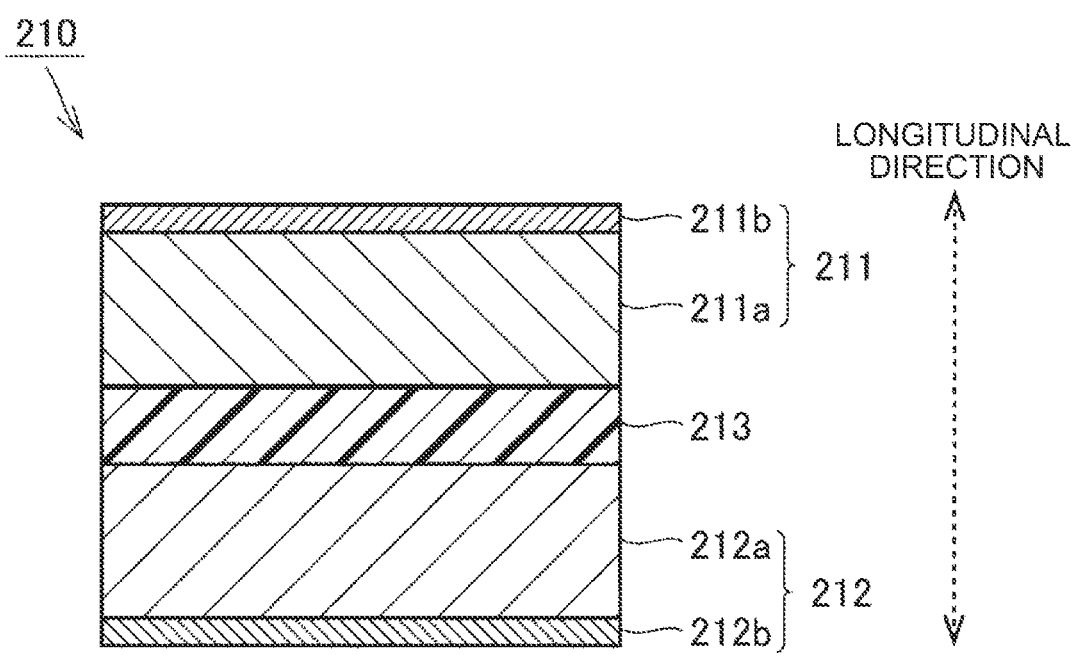
FIG. 3 is a cross-sectional view showing the configuration and stacking direction of the all-solid-state battery according to the first embodiment.

FIG. 3 is a diagram schematically showing the configuration of the all-solid-state battery 210. All-solid-state battery 210 includes a positive electrode layer 211, a negative electrode layer 212, and a solid electrolyte layer 213 as power storage elements. All-solid-state battery 210 may include an exterior body (not shown) for housing the power storage element. The exterior body is, for example, a pouch made of a metal foil laminate film.

Note that the all-solid-state battery 210 may be a single battery (cell) or a stacked battery. The stacked battery may be a monopolar stacked battery (parallel-connected stacked battery) or a bipolar stacked battery (series-connected stacked battery). The shape of the battery may be, for example, a coin shape, a laminate shape, a cylindrical shape, or a square shape.

Positive Electrode Layer

The positive electrode layer 211 includes a positive electrode active material layer 211*a* and a positive electrode current collector 211*b*. The positive electrode active material layer 211*a* is formed by applying a positive electrode slurry (slurry prepared by kneading the material of the positive electrode active material layer 211*a* and a solvent) onto the surface of the positive electrode current collector 211*b* and drying it. The positive electrode active material layer 211*a* is in close contact with the solid electrolyte layer 213. The thickness of the positive electrode active material layer 211*a* is, for example, 0.1 μm or more and 1000 μm or less.

Negative Electrode Layer

The negative electrode layer 212 includes a negative electrode active material layer 212*a* and a negative electrode current collector 212*b*. The negative electrode active material layer 212*a* is formed by applying a negative electrode slurry (slurry prepared by kneading the material of the negative electrode active material layer 212*a* and a solvent) onto the surface of the negative electrode current collector 212*b* and drying it. The negative electrode active material layer 212*a* is in close contact with the solid electrolyte layer 213. The thickness of the negative electrode active material layer 212*a* is, for example, 0.1 μm or more and 1000 μm or less.

Solid Electrolyte Layer

Solid electrolyte layer 213 is interposed between positive electrode layer 211 and negative electrode layer 212. Solid electrolyte layer 213 separates positive electrode layer 211 from negative electrode layer 212. The thickness of the solid electrolyte layer 213 is, for example, 0.1 μm or more and 1000 μm or less.

Further, the positive electrode layer 211, the solid electrolyte layer 213, and the negative electrode layer 212 are stacked in the front-rear direction (traveling direction) of the electrified vehicle 100. That is, in the first embodiment, the all-solid-state battery 210 is arranged such that the stacking direction of each layer of the all-solid-state battery 210 matches the longitudinal direction of the electrified vehicle 100.

Here, when the electrified vehicle 100 collides with another vehicle or the like, the all-solid-state battery 210 is also subjected to impact. For this reason, an internal short circuit or the like may occur in the all-solid-state battery and a large current may flow, so it is necessary to stop charging and discharging the all-solid-state battery. However, conventional systems do not take into account the impact that is applied to all-solid-state batteries. Therefore, depending on the form of the impact (magnitude and/or direction), charging and discharging of the all-solid-state battery may be stopped even if no particular problem occurs.

Therefore, in the present embodiment, the ECU 110 (processor 111) activates the all-solid-state battery 210 when the acceleration of the electrified vehicle 100 in the left-right direction and the gravity direction, which is detected by the acceleration sensor 140, exceeds the first reference value. Stops charging and discharging. Furthermore, the processor 111 allows charging and discharging of the all-solid-state battery 210 until the acceleration of the electrified vehicle 100 in the longitudinal direction (stacking direction) detected by the acceleration sensor 140 exceeds a second reference value that is larger than the first reference value. do. In other words, the processor 111 stops charging and discharging the all-solid-state battery 210 when the acceleration of the electrified vehicle 100 in the longitudinal direction (stacking direction) exceeds the second reference value. Note that charging and discharging of the all-solid-state battery 210 may be stopped by controlling to shut off the SMR or by controlling to stop the inverter and converter of the PCU.

Here, in the all-solid-state battery 210, the mechanical strength of each layer in the stacking direction is higher than the mechanical strength in the direction intersecting (orthogonal to) the stacking direction. Each of the first reference value and the second reference value is a value set in advance through tests or the like during the development of the electrified vehicle 100, taking this property into account. More specifically, the first reference value is a threshold value (lower limit value) of acceleration at which damage (cracking) or the like may occur in the all-solid-state battery 210 in a direction perpendicular to the stacking direction of the all-solid-state battery 210. The second reference value is a threshold value (lower limit value) of acceleration at which damage (cracking) or the like may occur in the all-solid-state battery 210 in the stacking direction of the all-solid-state battery 210.

By controlling charging and discharging as described above, charging and discharging of the all-solid-state battery 210 is allowed when the acceleration in the stacking direction is greater than the first reference value and less than or equal to the second reference value. Thereby, it is possible to suppress charging and discharging of the all-solid-state battery 210 from being stopped unnecessarily even though the all-solid-state battery 210 is not damaged.

Method of Controlling Vehicle

Figure 4:
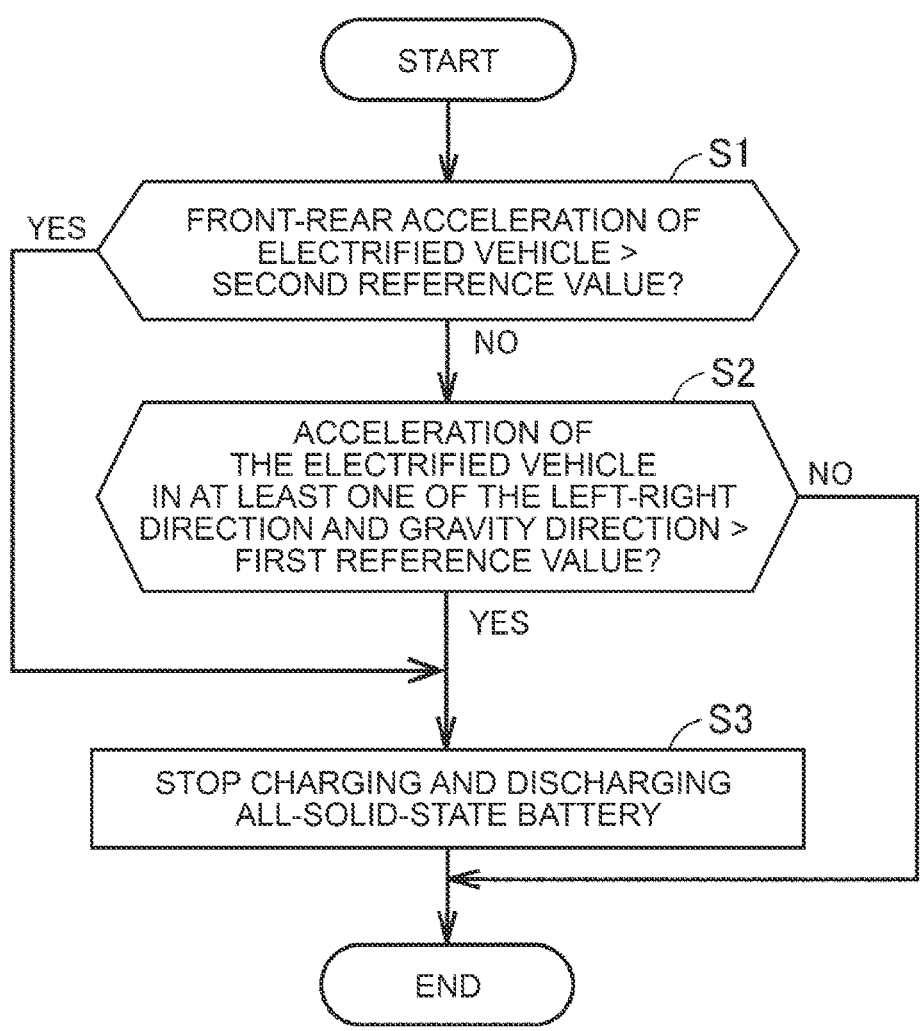
FIG. 4 is a flow diagram showing a method for controlling an electrified vehicle according to the first embodiment.

Next, a method of controlling the electrified vehicle 100 according to the first embodiment will be described with reference to FIG. 4. Note that the flow shown in FIG. 4 may be executed at predetermined intervals, or may be executed when any of the three axes of acceleration detected by the acceleration sensor 140 exceeds a predetermined value (for example, a value smaller than the first reference value).

In S1, the processor 111 determines that the acceleration (typically negative acceleration associated with a collision of the electrified vehicle 100) in the longitudinal direction (stacking direction) of the electrified vehicle 100 detected by the acceleration sensor 140 (absolute value) is the second reference. Determine whether it is greater than the value. If the longitudinal acceleration is greater than the second reference value (YES in S1), the process proceeds to S3. If the longitudinal acceleration is less than or equal to the second reference value (NO in S1), the process proceeds to S2.

In S2, the processor 111 determines whether at least one of the acceleration (absolute value) in the left-right direction and the acceleration (absolute value) in the direction of gravity of the electrified vehicle 100 detected by the acceleration sensor 140 is larger than the first reference value. If at least one of the above values is larger than the first reference value (YES in S2), the process proceeds to S3. If both of the above values is less than or equal to the first reference value (NO in S2), the process ends. In this case, charging and discharging of the all-solid-state battery 210 is allowed. Note that the process of S2 may be executed before the process of S1, or may be executed simultaneously with the process of S1. Further, the first reference value corresponding to the left-right direction and the first reference value corresponding to the gravity direction may be equal to each other or may be different from each other.

In S3, the processor 111 performs processing to stop charging and discharging the all-solid-state battery 210.

As described above, in the first embodiment, when the acceleration in the direction intersecting (orthogonal to) the stacking direction of the all-solid-state battery 210 exceeds the first reference value, charging and discharging of the all-solid-state battery 210 is prohibited, and the all-solid-state battery 210 is allowed to be charged and discharged until the acceleration in the stacking direction exceeds the second reference value. As a result, since the reference value corresponding to the stacking direction (second reference value) is higher than the reference value corresponding to the crossing direction (first reference value), the entire solid body is It is possible to suppress charging and discharging of the all-solid-state battery 210 from being stopped unnecessarily. As a result, the electrified vehicle 100 can travel a certain distance (limp home) after receiving a relatively small impact due to a minor collision or the like.

Second Embodiment

Next, a second embodiment of the present disclosure will be described with reference to FIGS. 5 to 7. In the second embodiment, unlike the first embodiment in which the stacking direction of each layer of the all-solid-state battery 210 is the front-rear direction of the electrified vehicle 100, the stacking direction is in the direction of gravity. Note that the same components as in the first embodiment will be designated by the same reference numerals and will not be repeatedly described.

Overall Structure

Figure 5:
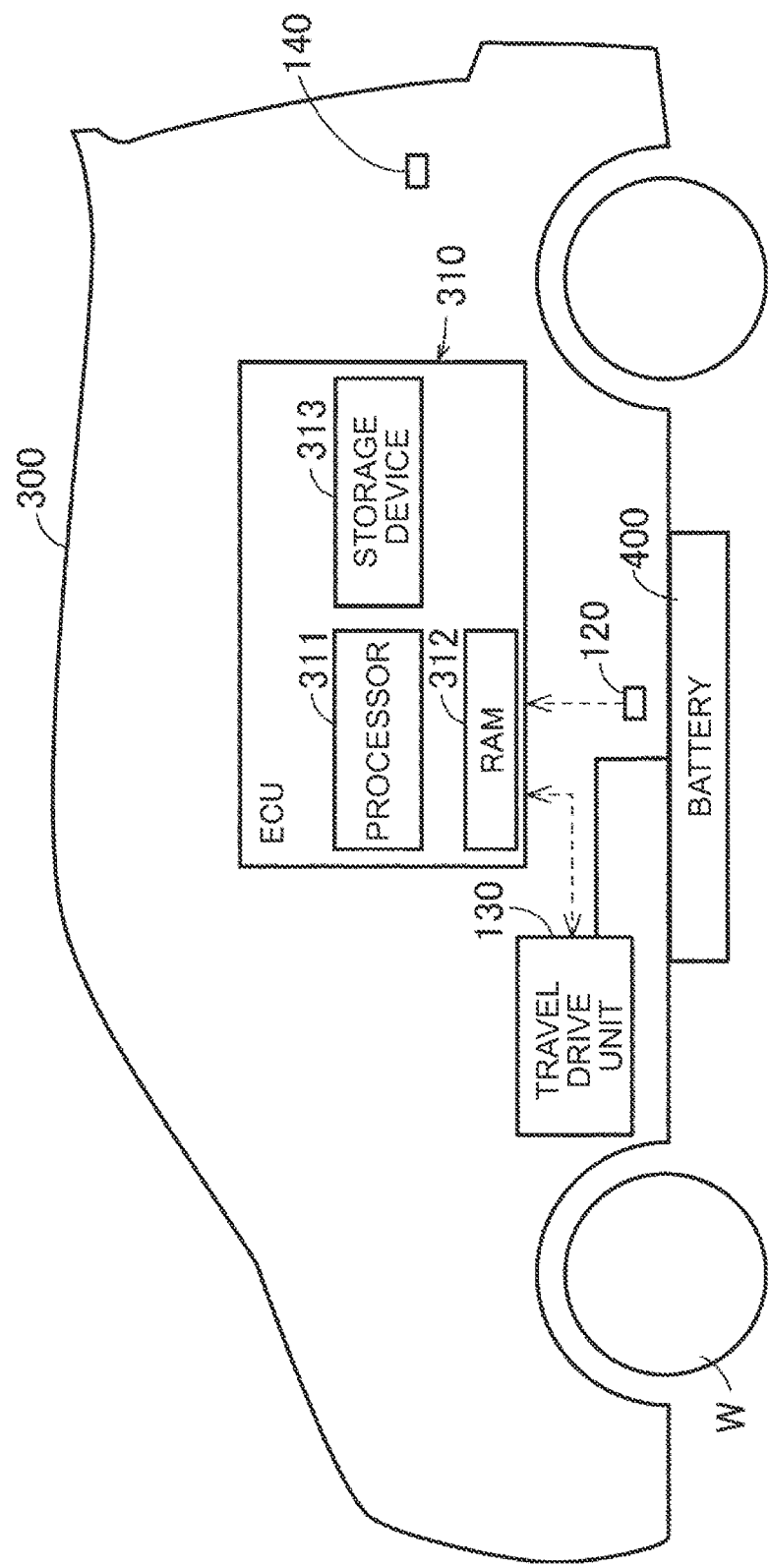
FIG. 5 is a diagram showing the configuration of an electrified vehicle according to the second embodiment.

FIG. 5 is a diagram schematically showing the overall configuration of an electrified vehicle 300 according to the second embodiment. The electrified vehicle 300 includes a battery 400 that stores power for driving. Note that the electrified vehicle 300 is an example of a "vehicle" in the present disclosure.

The electrified vehicle 300 includes an ECU 310. ECU 310 is configured to control charging and discharging of battery 400. ECU 310 includes a processor 311, RAM 312, and storage device 313.

Figure 6:
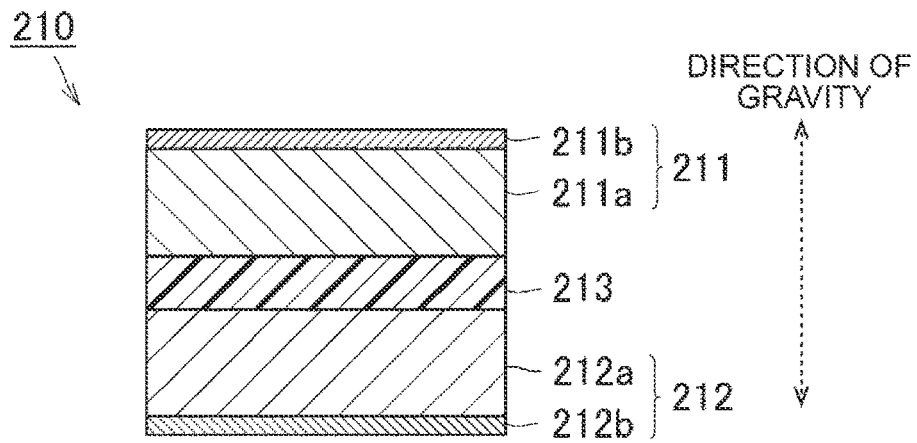
FIG. 6 is a cross-sectional view showing the configuration and stacking direction of an all-solid-state battery according to the second embodiment.
Figure 7:
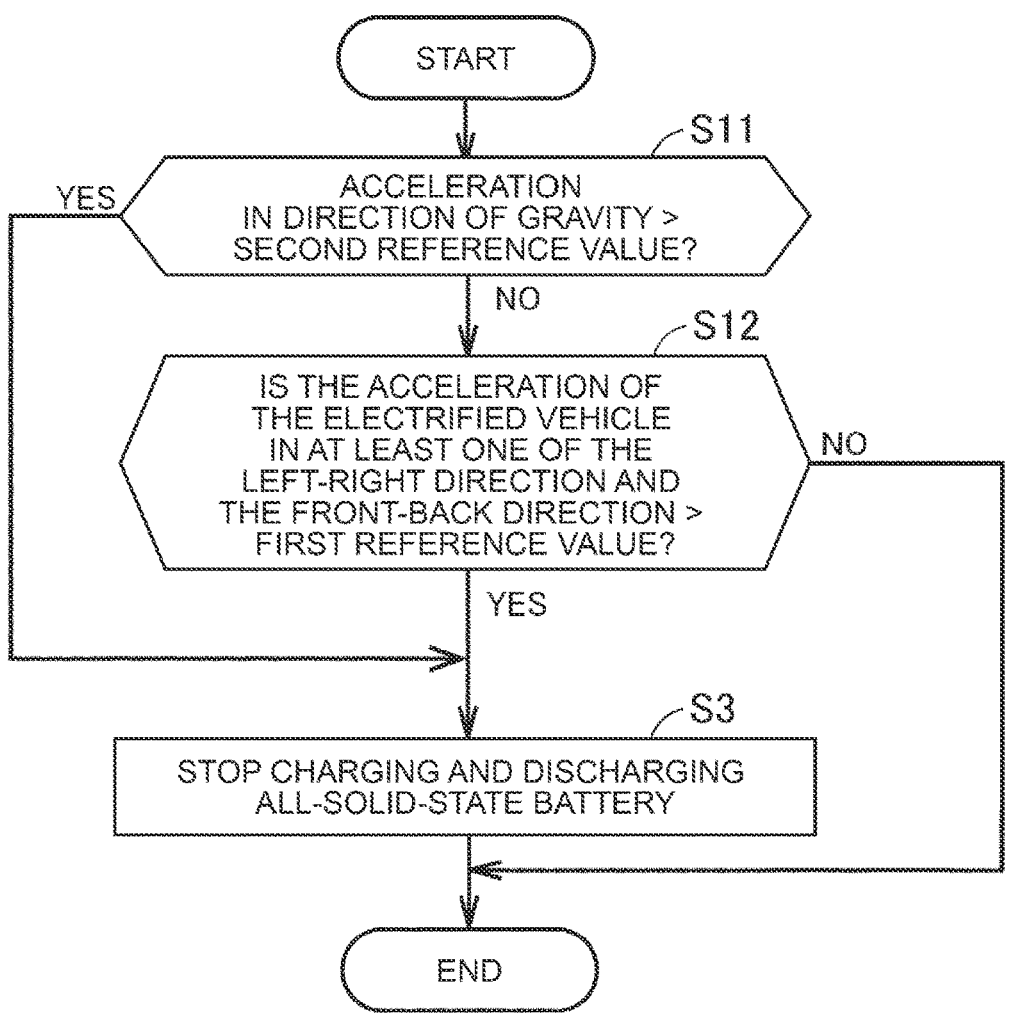
FIG. 7 is a flow diagram showing a method for controlling an electrified vehicle according to the second embodiment.

Battery 400 includes an all-solid-state battery 210 (see FIG. 6). Next, the configuration of the all-solid-state battery 210 will be explained.

All-Solid-State Battery

FIG. 6 is a diagram schematically showing the configuration of the all-solid-state battery 210. In the second embodiment, the positive electrode layer 211, the solid electrolyte layer 213, and the negative electrode layer 212 are stacked in the direction of gravity. That is, in the second embodiment, the all-solid-state battery 210 is arranged such that the stacking direction of each layer of the all-solid-state battery 210 coincides with the direction of gravity.

Method of Controlling Vehicle

Next, a method of controlling the electrified vehicle 300 will be described with reference to FIG. 7. Note that the same controls (processes) as in the first embodiment will not be repeatedly explained.

In S11, the processor 311 determines whether the acceleration (absolute value) in the direction of gravity detected by the acceleration sensor 140 is larger than the second reference value. If the acceleration in the direction of gravity is larger than the second reference value (YES in S11), the process proceeds to S3. If the acceleration in the direction of gravity is less than or equal to the second reference value (NO in S11), the process proceeds to S12.

In S12, the processor 311 determines whether at least one of the horizontal acceleration (absolute value) of the electrified vehicle 300 and the longitudinal acceleration (absolute value) of the electrified vehicle 300 detected by the acceleration sensor 140 is larger than the first reference value. If at least one of the above values is larger than the first reference value (YES in S12), the process proceeds to S3. If both of the above values is equal to or less than the first reference value (NO in S12), the process ends. In this case, charging and discharging of the all-solid-state battery 210 is allowed. Note that the process of S12 may be executed before the process of S11, or may be executed simultaneously with the process of S11. Further, the first reference value corresponding to the left-right direction and the first reference value corresponding to the front-rear direction may be equal to each other or may be different from each other.

Note that the other configurations and controls of the second embodiment are the same as those of the first embodiment.

Figure 8:
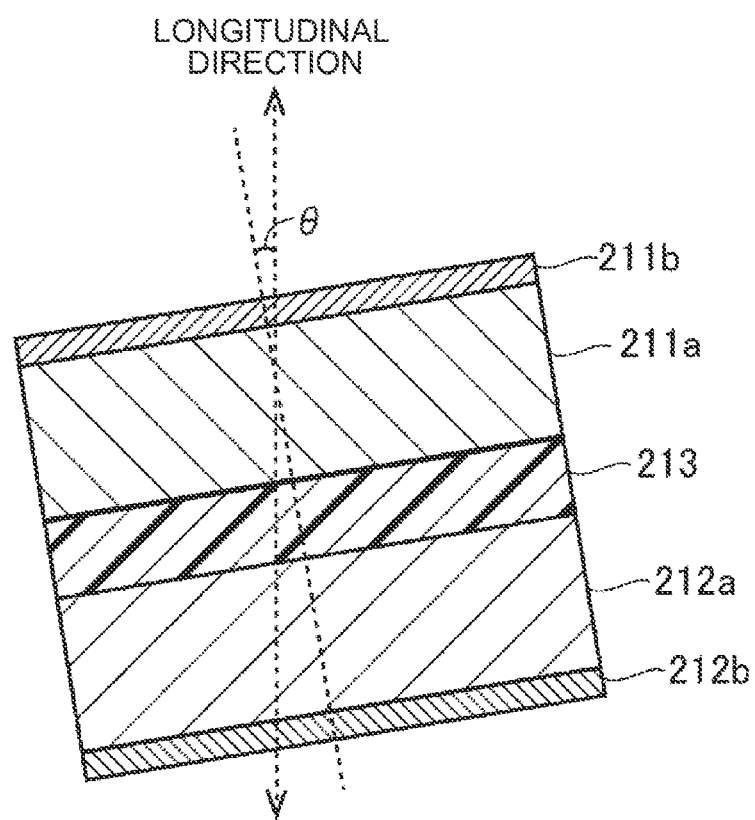
FIG. 8 is a cross-sectional view showing the structure and stacking direction of an all-solid-state battery according to a modification of the first and second embodiments.

In the first embodiment described above, an example was shown in which the stacking direction of each layer of the all-solid-state battery 210 is the front-rear direction of the electrified vehicle 100, but the present disclosure is not limited to this. For example, as shown in FIG. 8, the stacking direction may be inclined by a predetermined angle θ with respect to the front-rear direction. In this case, for example, the acceleration component in the stacking direction may be calculated based on the acceleration in the longitudinal direction and the acceleration in the direction of gravity (or the lateral direction) detected by the acceleration sensor 140, and charging/discharging of the all-solid-state battery 210 may be prohibited. It may be determined whether. Note that the second embodiment may also be controlled in the same manner.

In the first and second embodiments described above, an example was shown in which the stacking direction of the all-solid-state battery 210 is the longitudinal direction of the electrified vehicle 100 and the gravity direction, respectively, but the present disclosure is not limited to this. For example, the stacking direction may be the left-right direction of the electrified vehicle.

In the first and second embodiments described above, an example is shown in which a three-axis acceleration sensor is used as the acceleration sensor 140, but the present disclosure is not limited to this. For example, a two-axis acceleration sensor may be used. Further, for example, two or more uniaxial acceleration sensors may be used. In this case, acceleration in the direction of gravity (or acceleration in the left-right direction) may not be detected.

In the first and second embodiments described above, an example was shown in which charging and discharging of the all-solid-state battery 210 is prohibited (permitted), but the present disclosure is not limited to this. Only one of charging and discharging may be prohibited (permitted).

In the first and second embodiments described above, an example was shown in which the acceleration sensor 140 detects accelerations in a plurality of mutually orthogonal directions, but the present disclosure is not limited to this. The acceleration sensor may detect acceleration in a plurality of directions that are not orthogonal to each other but intersect with each other.

Note that the configurations (processing) of the above-described embodiment and each of the above-described modifications may be combined with each other.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A vehicle comprising:
an all-solid-state battery in which a positive electrode layer, a solid electrolyte layer, and a negative electrode layer are stacked in a predetermined direction, the all-solid-state battery having a higher mechanical strength in the predetermined direction than in a direction intersecting the predetermined direction;
an acceleration sensor configured to detect a first acceleration in the direction intersecting the predetermined direction and a second acceleration in the predetermined direction; and
a processor configured to prohibit charging and discharging of the all-solid-state battery in a case where i) the first acceleration exceeds a first reference value, and in a case where ii) the second acceleration exceeds a second reference value that is larger than the first reference value.

2. The vehicle according to claim 1, wherein the predetermined direction is a direction along a front-rear direction of the vehicle.

3. The vehicle according to claim 1, wherein the predetermined direction is a direction along a direction of gravity.

4. The vehicle according to claim 1, wherein the acceleration sensor is a three-axis acceleration sensor that detects accelerations in three axes that are orthogonal to each other.

5. The vehicle according to claim 1, wherein
the predetermined direction is inclined at a predetermined angle with respect to a front-rear direction of the vehicle, and
the acceleration sensor is configured to calculate an acceleration component in the predetermined direction based on detected accelerations in the front-rear direction and a direction of gravity.

6. The vehicle according to claim 1, wherein
the processor is further configured to
determine whether the first acceleration exceeds the first reference value,
determine whether the second acceleration exceeds the second reference value, in response to a first determination that the first acceleration does not exceed the first reference value, and
allow the charging and discharging of the all-solid-state battery in response to a second determination that the second acceleration does not exceed the second reference value, and
the charging and discharging of the all-solid-state battery is prohibited in response to a third determination that the first acceleration exceeds the first reference value and a fourth determination that the second acceleration exceeds the second reference value.

7. The vehicle according to claim 1, wherein
the processor is further configured to
determine whether the second acceleration exceeds the second reference value,
determine whether the first acceleration exceeds the first reference value, in response to a first determination that the second acceleration does not exceed the second reference value, and
allow the charging and discharging of the all-solid-state battery in response to a second determination that the first acceleration does not exceed the first reference value, and
the charging and discharging of the all-solid-state battery is prohibited in response to a third determination that the first acceleration exceeds the first reference value and a fourth determination that the second acceleration exceeds the second reference value.

8. The vehicle according to claim 1, wherein
the first reference value is a threshold value of acceleration at which damage occurs in the all-solid-state battery in the direction intersecting the predetermined direction, and
the second reference value is a threshold value of acceleration at which damage occurs in the all-solid-state battery in the predetermined direction.

9. A method of controlling a vehicle including an all-solid-state battery, the method comprising:
determining whether a first acceleration in a direction intersecting a predetermined direction in which a positive electrode layer, a solid electrolyte layer, and a negative electrode layer of the all-solid-state battery are stacked exceeds a first reference value, the all-solid-state battery having a higher mechanical strength in the predetermined direction than in a direction intersecting the predetermined direction;
determining whether a second acceleration in the predetermined direction exceeds a second reference value; and
prohibiting charging and discharging of the all-solid-state battery in a case where i) the first acceleration in the direction intersecting the predetermined direction exceeds the first reference value, and in a case where ii) the second acceleration exceeds the second reference value.

10. The method according to claim 9, further comprising:
determining whether the first acceleration exceeds the first reference value;
determining whether the second acceleration exceeds the second reference value, in response to a first determination that the first acceleration does not exceed the first reference value; and
allowing the charging and discharging of the all-solid-state battery in response to a second determination that the second acceleration does not exceed the second reference value,
wherein the charging and discharging of the all-solid-state battery is prohibited in response to a third determination that the first acceleration exceeds the first reference value and a fourth determination that the second acceleration exceeds the second reference value.

11. The method according to claim 9, further comprising:
determining whether the second acceleration exceeds the second reference value;
determining whether the first acceleration exceeds the first reference value, in response to a first determination that the second acceleration does not exceed the second reference value; and
allowing the charging and discharging of the all-solid-state battery in response to a second determination that the first acceleration does not exceed the first reference value,
wherein the charging and discharging of the all-solid-state battery is prohibited in response to a third determination that the first acceleration exceeds the first reference value and a fourth determination that the second acceleration exceeds the second reference value.

* * * * *